(12) United States Patent
Toguchi

(10) Patent No.: US 11,599,976 B2
(45) Date of Patent: Mar. 7, 2023

(54) DISPLAY APPARATUS AND CONTROL METHOD WITH IMAGES OF DIFFERENT DYNAMIC RANGES

(71) Applicant: CANON KABUSHIKI KAISHA, Tokyo (JP)

(72) Inventor: Kazuomi Toguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 17/169,215

(22) Filed: Feb. 5, 2021

(65) Prior Publication Data

US 2021/0256668 A1 Aug. 19, 2021

(30) Foreign Application Priority Data

Feb. 13, 2020 (JP) .............................. JP2020-022669

(51) Int. Cl.
*G06T 5/00* (2006.01)
*G09G 5/10* (2006.01)

(52) U.S. Cl.
CPC .............. *G06T 5/009* (2013.01); *G09G 5/10* (2013.01); *G06T 2207/20208* (2013.01); *G09G 2320/0233* (2013.01); *G09G 2320/0238* (2013.01); *G09G 2320/0613* (2013.01); *G09G 2320/0626* (2013.01)

(58) Field of Classification Search
CPC . G06T 5/009; G06T 2207/20208; G09G 5/10; G09G 2320/0233; G09G 2320/0238; G09G 2320/0613; G09G 2320/0626; G09G 2320/0271; G09G 2320/0686; G09G 2340/12
See application file for complete search history.

(56) References Cited

U.S. PATENT DOCUMENTS

| 10,885,614 B2 * | 1/2021 | Park .......................... G06T 5/50 |
| 11,070,776 B2 * | 7/2021 | Nakajima ............. H04N 9/3155 |
| 2018/0174526 A1 * | 6/2018 | Chesnokov .......... G09G 3/3406 |
| 2019/0058855 A1 * | 2/2019 | Uchimura ............ G11B 27/326 |

FOREIGN PATENT DOCUMENTS

JP 2008-225026 A 9/2008

* cited by examiner

*Primary Examiner* — Rodney Amadiz
(74) *Attorney, Agent, or Firm* — Canon U.S.A., Inc. IP Division

(57) ABSTRACT

A display apparatus switches to any one of a plurality of modes, generates a partial image, and controls a luminance of a black region. The plurality of modes includes a first mode capable of displaying an image of a first dynamic range on a display unit and a second mode capable of displaying an image of a second dynamic range wider than the first dynamic range on a display unit. The partial image includes at least a black region and is superimposed on an image displayed on the display unit. Controlling includes controlling a luminance of the black region of the partial image in the second mode to be less than a luminance of the black region of the partial image in the first mode.

8 Claims, 5 Drawing Sheets

DISPLAY APPARATUS AND CONTROL METHOD WITH IMAGES OF DIFFERENT DYNAMIC RANGES

BACKGROUND

Technical Field

One disclosed aspect of the embodiments relates to an image display control technique.

Description of the Related Art

A display apparatus capable of displaying a wider dynamic range than a conventional dynamic range has appeared. The dynamic range that can be displayed by the conventional display apparatus is called SDR (Standard Dynamic Range), and a dynamic range that is wider than can be displayed by the conventional display apparatus is called HDR (High Dynamic Range).

In such display apparatuses, when displaying an image captured by the HDR, the peak luminance and contrast is high, the power consumption is increased as compared with the SDR. Further, since in OSDs (On Screen Display) or the like to be superimposed on the image, input gradation is fixed to high value, not only increase in power consumption but also deterioration of visibility due to too much glare with extension of the peak luminance. The OSD is a function to superimpose and display information such as settings and shooting conditions of a shooting device on an image shot by a camera, for example. Japanese Patent Laid Open No. 2008-225026 discloses techniques of detecting a feature amount of image signal, luminance of OSD signal and setting the luminance of the OSD signal so as not to exceed the maximum luminance that the image signal can have.

In Japanese Patent Laid Open No. 2008-225026, although it is possible to improve visibility and reduce power consumption as compared with the OSD signal of the fixed value, since the luminance of the black band image in the OSD signal as compared with the SDR mode is high, the power consumption of the black band image is increased. Further, since the visibility of the OSD is determined by a contrast ratio between the black band image and the character image, the luminance of the character image can be further lowered by lowering the luminance of the black band image, and there is room for improvement in power consumption related to the character image.

SUMMARY

An aspect of the embodiments has been made in consideration of the aforementioned problems, and realizes techniques for suppressing increase in power consumption and reducing luminance degradation when displaying an image with a wider dynamic range than before.

In order to solve the aforementioned problems, the disclosure provides a display apparatus including a memory and at least one processor and/or at least one circuit which function as a switching unit, a generating unit, and a control unit. The switching unit is configured to switch to any one of a plurality of modes including a first mode capable of displaying an image of a first dynamic range on a display and a second mode capable of displaying an image of a second dynamic range wider than the first dynamic range on a display. The generating unit is configured to generate a partial image which includes at least a black region and is superimposed on an image displayed on the display. The control unit is configured to control the luminance of the black region of the partial image in the second mode is less than the luminance of the black region of the partial image in the first mode.

In order to solve the aforementioned problems, the disclosure provides a method of controlling a display apparatus including switching to any one of a plurality of modes including a first mode and a second mode, generating a partial image, and controlling the luminance. The first mode is capable of displaying an image of a first dynamic range on a display unit and the second mode is capable of displaying an image of a second dynamic range wider than the first dynamic range on the display unit. The partial image includes at least a black region and is superimposed on the image displayed on the display. Controlling the luminance controls such that the luminance of the black region of the partial image in the second mode is less than the luminance of the black region of the partial image in the first mode.

In order to solve the aforementioned problems, the disclosure provides a non-transitory computer-readable storage medium storing a program that causes a computer to execute a method of controlling a display apparatus. The method includes switching to any one of a plurality of modes including a first mode and a second mode, generating a partial image, and controlling the luminance. The first mode is capable of displaying an image of a first dynamic range on a display and a second mode capable of displaying an image of a second dynamic range wider than the first dynamic range on the display. The partial image includes at least a black region and is superimposed on the image displayed on the display. Controlling the luminance controls such that the luminance of the black region of the partial image in the second mode is less than the luminance of the black region of the partial image in the first mode.

According to the disclosure, it is possible to suppress increase in power consumption and to reduce luminance degradation when displaying an image with a wider dynamic range than before.

Further features of the disclosure will become apparent from the following description of exemplary embodiments (with reference to the attached drawings).

DESCRIPTION OF THE EMBODIMENTS

Figure 1A:
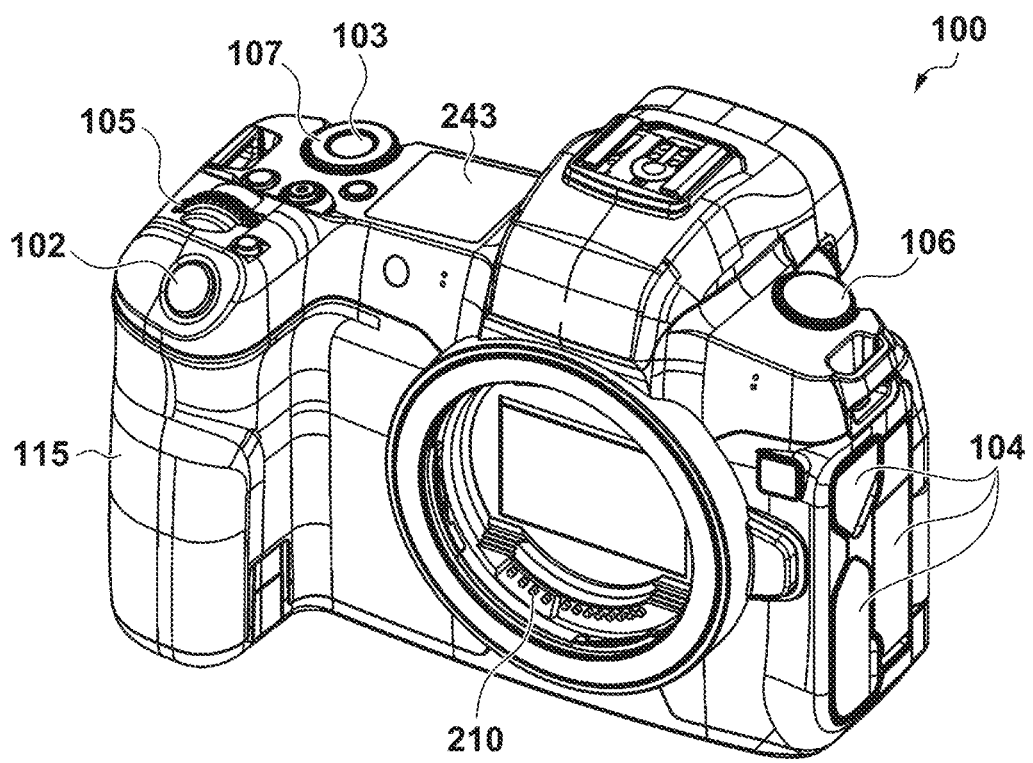
FIGS. 1A and 1B are external views illustrating an apparatus configuration of a present embodiment.

Hereinafter, embodiments will be described in detail with reference to the accompanying drawings. The following embodiments do not limit the disclosure. Although a plurality of features are described in the embodiments, not all of the plurality of features are essential to the disclosure, and the plurality of features may be arbitrarily combined. Furthermore, in the accompanying drawings, the same reference numerals are assigned to the same or similar components, and a repetitive description thereof is omitted.

First Embodiment

Hereinafter, embodiments in which a display apparatus of the disclosure is applied to a digital camera which is an image capture apparatus capable of shooting a still image and/or a moving image will be described in detail with reference to the accompanying drawings.

<Apparatus Configuration>

Figure 1B:
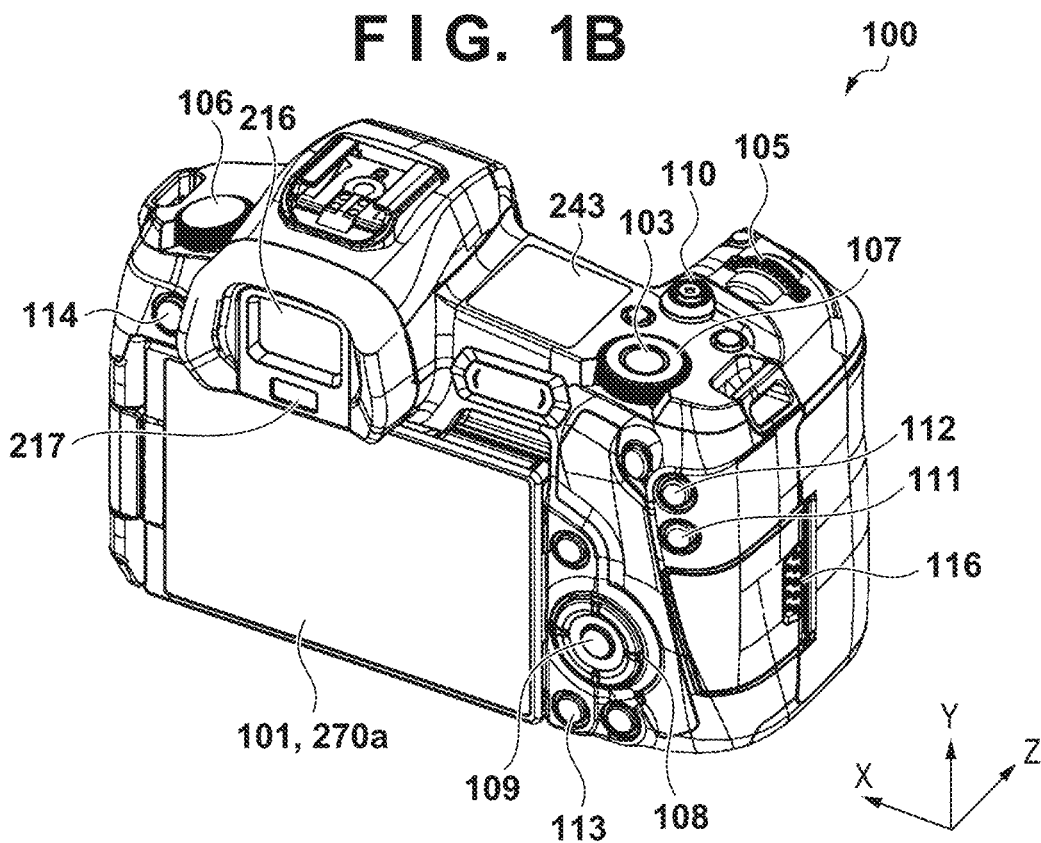
Figure 2:
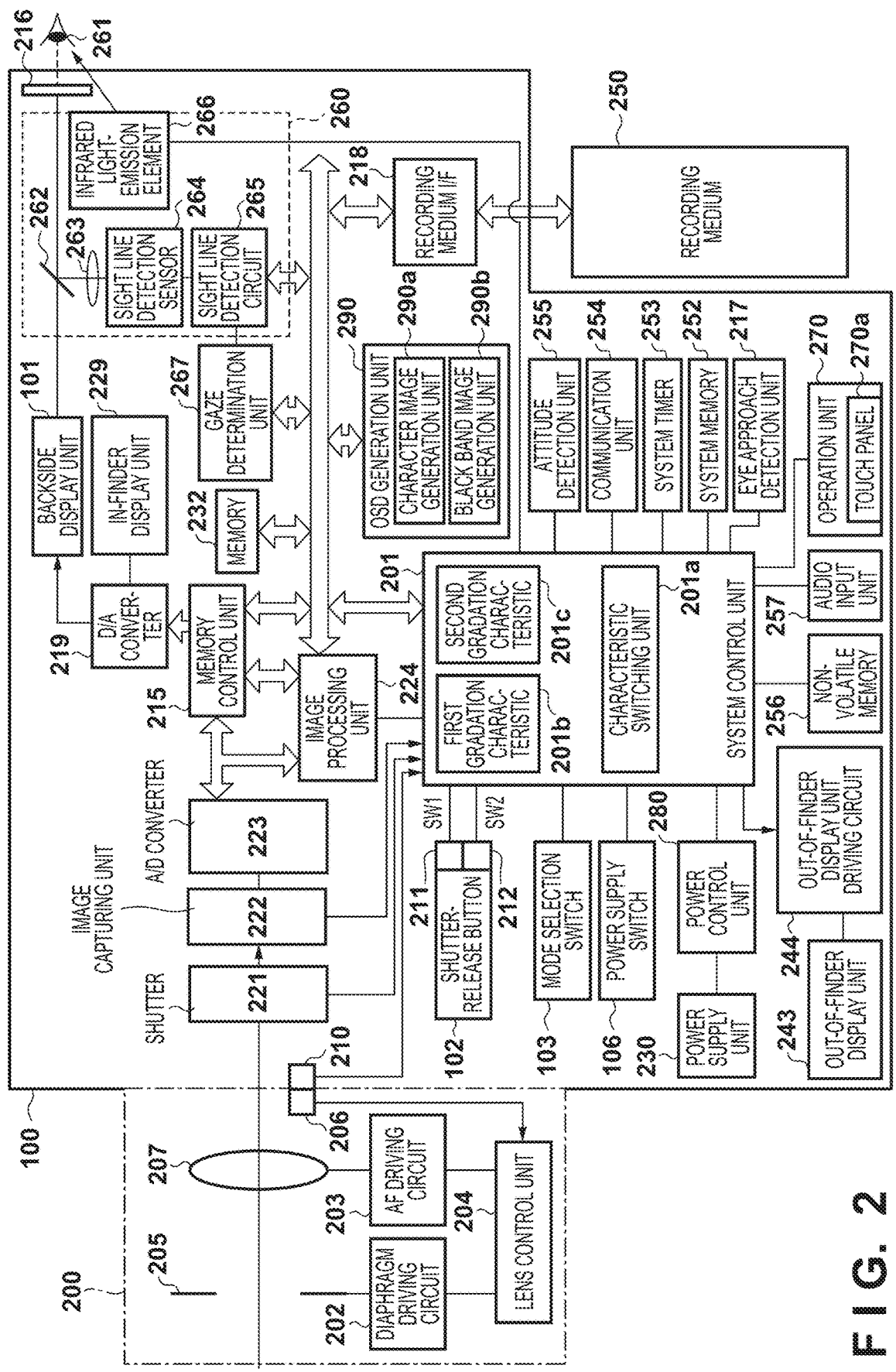
FIG. 2 is a block diagram illustrating an apparatus configuration of the present embodiment.

With reference to FIGS. 1A, 1B and 2, the configuration and functions of a digital camera 100 according to the present embodiment will be described.

In FIGS. 1A and 1B, a backside display unit 101 is a display device, such as a liquid crystal panel or an organic electroluminescent (EL) panel, provided on the back surface of the camera body outside a finder, for displaying images and various types of information so that a user can visually recognize them. Moreover, the backside display unit 101 has a function of reproducing a still image after the still image was shot, a function of displaying a moving image that is being recorded, and a live view display (through-the-lens display) function as well. A touch panel (touch screen) 270a is provided on the backside display unit 101. The touch panel 270a is a touch detection device that can detect a contact (touch operation) on the display surface of the backside display unit 101 (operation surface of the touch panel 270a). An out-of-finder display unit 243 is a display device such as a Liquid Crystal Display (LCD) provided on the upper surface of the camera body, and displays various setting values of the camera such as a shutter speed and a diaphragm aperture.

A shutter-release button 102 is a push button type operation member for giving a shooting instruction. A mode selection switch 103 is a dial type operation member for switching between various modes. The mode selection switch 103 switches the operation mode of a system control unit 201 to any of a still image shooting mode, a moving image recording mode, and a reproduction mode. The still image shooting mode includes an automatic shooting mode, an automatic scene determination mode, a manual mode, aperture-priority Auto Exposure (AE) mode (Av mode), shutter-priority AE mode (Tv mode), and program AE mode (P mode), for example. The still image shooting mode also includes various scene mode each of which scene-specific shooting setting is made, custom mode, and the like.

Using the mode selection switch 103, the mode is directly switched to any of the plurality of modes included in the still image shooting mode. Alternatively, it is also possible to switch, using the mode selection switch 103, to the still image shooting mode and then to switch, using another operation member, to any of the plurality of modes included in the still image shooting mode. Similarly, also the moving image recording mode and the reproduction mode may include a plurality of modes.

A terminal cover 104 is a cover member for protecting a connector (not illustrated) for connecting an external device and the digital camera 100 via a cable such as a Universal Serial Bus (USB) cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for the switching on/off of the power supply to the digital camera 100. A sub electronic dial 107 is a rotating operation member that can move a selected frame, scroll images, and/or the like. A cross key 108 is a movement instruction member that can perform, by one of four-directional buttons constituted by UP, DOWN, LEFT and RIGHT being pressed down, an operation that corresponds to the pressed portion of the cross key 108. A SET button 109 is a push button type operation member that is mainly used for determining a selection item. A video recording button 110 is a push button type operation member that is used for switching on/off of the live view display in the still image shooting mode and for starting or stopping the moving image shooting (recording) in the moving image recording mode. An enlargement button 111 is a push button type operation member that is used for turning on/off of the enlargement display during the live view and for changing the enlargement ratio during the enlargement display. Further, the enlargement button 111 is used for enlarging a reproduced image in a reproduction mode and increasing a magnification ratio. By operating the main electronic dial 105 after turning on of the enlarged display, the live view image can be enlarged or reduced. The main electronic dial 105 functions as an enlargement button for enlarging the reproduced image and increasing the enlargement ratio. An AE lock button 112 is a push button type operation member that can fix an exposure state by being pressed in a shooting standby state. The reproduction button 113 is a push-button type operation member that is used to switch between the shooting mode and the reproduction mode. By pressing the reproduction button 113 during the shooting mode, the operation mode is switched to the reproduction mode, and the latest image among the images recorded on a recording medium 250 can be displayed on the backside display unit 101. A menu button 114 is a push button type operation member for displaying a menu screen on which various settings can be made on the backside display unit 101 when pressed. The user can intuitively perform various settings using the menu screen displayed on the backside display unit 101, the cross key 108, and the SET button 109.

The displays of the backside display unit 101 and an in-finder display unit 229 described later are controlled by the system control unit 201 as an electronic view finder (EVF) in accordance with the various operation modes described above.

An eyepiece part 216 is a look-through type eyepiece finder. The user can visually recognize an image displayed on the in-finder display unit 229 via the eyepiece part 216, and can confirm the focus and composition of the captured object image taken in through the lens unit 200.

An eye approach detection unit 217 is arranged near the eyepiece part 216, and can detect approach of any object to the eyepiece part 216. As the eye approach detection unit 217, for example, an infrared proximity sensor is used.

A communication terminal 210 is an electric contact for the digital camera 100 to perform communication with a lens unit 200 (FIG. 2). A lid 116 is a member for opening or closing a slot for mounting/removing the recording medium 250 to/from the digital camera 100. A grip portion 115 has a shape that makes it easy to be grasped by a user's a right hand when he or she holds the digital camera 100. The shutter-release button 102 and the main electronic dial 105 are arranged at positions where the grip portion 115 can be operated by the index finger of the right hand while holding the digital camera 100 by gripping the grip portion 115 with the little finger, the ring finger and the middle finger of the right hand. In the same state, the sub electronic dial 107 is arranged at a position operable with the thumb of the right hand.

Next, with reference to FIG. 2, the internal configuration of the digital camera 100 and the lens unit 200 of the present embodiment will be described. In FIG. 2, components that are the same as those in FIGS. 1A and 1B are denoted by the same reference signs.

In FIG. 2, the lens unit 200 is equipped with a shooting lens 207, and is detachable from the digital camera 100. The shooting lens 207 is usually constituted by a plurality of lenses, but is simplified here and is shown by one lens only. A communication terminal 206 is an electric contact for the lens unit 200 to perform communication with the digital camera 100. The communication terminal 210 is an electric contact for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

A focal plane shutter 221 can freely control the exposure time of the image capturing unit 222 in accordance with an instruction from the system control unit 201. The image capturing unit 222 is an image sensor constituted by an imaging element such as a Charge-Coupled Device (CCD) or a Complementary Metal Oxide Semiconductor (CMOS) for converting the object image into electrical signals. An Analog-to-Digital (A/D) converter 223 converts analog signals of one pixel output from the image capturing unit 222 into digital signals of, for example, 10 bits.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

A memory control unit 215 controls to exchange data between the A/D converter 223, the image processing unit 224, and the memory 232. Digital data output from the A/D converter 223 is directly written into the memory 232 via both the image processing unit 224 and the memory control unit 215 or via the memory control unit 215. The memory 232 stores image data obtained from the imaging unit 222 and the A/D converter 223, and image display data for display on the backside display unit 101 or the in-finder display unit 229. The memory 232 has a storage capacity that is sufficient for storing a predetermined number of still images as well as moving images and audio for a predetermined time period. The memory 232 also functions as a memory for image display (video memory).

A Digital-to-Analog (D/A) converter 219 converts the image display data stored in the memory 232 into an analog signal and supplies the backside display unit 101 or the in-finder display unit 229 with the analog signal. The image display data that was written into the memory 232 is displayed by the backside display unit 101 or the in-finder display unit 229 via the D/A converter 219. The backside display unit 101 and the in-finder display unit 229 perform display in accordance with the analog signal from the D/A converter 219. In this manner, the digital signals stored in the memory 232 are converted into analog signals, and the analog signals are successively transmitted to the backside display unit 101 or the in-finer display unit 229 so as to be displayed thereon, making it possible to perform live view (LV) display (through-the lens image display).

Various setting values of the camera such as a shutter speed and a diaphragm aperture are displayed on the out-of-finder display unit 243 via an out-of-finder display unit driving circuit 244.

A nonvolatile memory 256 is, for example, an Eletrically Erasable Programmable Read Only Memory (EEPROM), which is electrically erasable and recordable. In the nonvolatile memory 256, constants and programs, for example, for operating the system control unit 201 are stored. In this context, "programs" may refer to programs for executing various flowcharts that will be described later.

The system control unit 201 has a CPU (Central Processing Unit or a MPU (Micro Processing Unit) for overall controlling the entire digital camera 100, and realizes, by executing the programs stored in the nonvolatile memory 256, the procedures of the flowchart that will be described later. The system memory 252 is, for example, a Random Access Memory (RAM) and used also as a work memory where constants and variables for operating the system control unit 201, and the programs read out from the nonvolatile memory 256 are expanded. The system control unit 201 controls the memory 232, the D/A converter 219, the backside display unit 101, the in-finder display unit 229, and the like, so as to perform display control. A system timer 253 is a time measurement unit for measuring time periods for various types of controls and the time of an integrated clock. The system control unit 201 executes the program or instructions stored in the memory 252 or 256 to perform operations of corresponding functional units as shown in the flowchart in FIG. 3. These functionalities or units may include a switching unit, a generating unit configured to generate a partial image, and a control unit described in the flowchart.

In addition, the system control unit 201 has a characteristic switching unit 201a that can switch to either a first mode (SDR mode) in which an image signal of the first gradation characteristic 201b is displayed or a second mode (HDR mode) in which an image signal of the second gradation characteristic 201c having a dynamic range wider than that of the first gradation characteristic 201b is displayed on the in-finder display unit 229 or the backside display unit 101.

A first gradation characteristic 201b is an EOTF (Electro-Optical Transfer Function) characteristic for controlling the gradation characteristic of the image signal output to the in-finder display unit 229 or the backside display unit 101 to SDR (Standard Dynamic Range). A second gradation characteristic 201c is an EOTF characteristic for controlling the gradation characteristic of the image signal output to the backside display unit 101 or the in-finder display unit 229 to HDR (High Dynamic Range). A characteristic switching unit 201a switches between the first gradation characteristic 201b and the second gradation characteristic 201c.

The SDR is gradation characteristics corresponding to a dynamic range that can be displayed by a conventional display apparatus, and are defined by, for example, the standard ITU-R BT. 709. On the other hand, the HDR (High Dynamic Range) having a wider dynamic range than that of a conventional display apparatus is defined by the Rec. ITU-R BT. 2100 standard.

The digital camera 100 of the present embodiment can be set to an SDR mode for displaying an SDR image or an HDR mode for displaying an HDR image on the in-finder display unit 229 or the backside display unit 101 by the user operating a menu screen or the like. In the system control unit 201, the characteristic switching unit 201a performs a control to be described later according to which mode is set.

An OSD generation unit 290 includes a character image generation unit 290a and a black band image generation unit 290b. The character image generation unit 290a generates a character image including a character region and/or a graphic image including a graphic region. The black band image generation unit 290b generates a black band image including a black region. The OSD generation unit 290 generates an OSD image by forming a graphic image including a character image and/or a graphic image including a graphic region on the black band image. The OSD image is a partial image superimposed on an image displayed on the in-finder display unit 229 or the backside display unit 101. A method of controlling the display luminance of the OSD image generated by the OSD generation unit 290 will be described later.

The first shutter switch 211 and the second shutter switch 212 input the following operation instructions to the system control unit 201.

While the shutter-release button 102 provided on the digital camera 100 is being operated, that is, pressed halfway (the shooting preparation instruction), the first shutter switch 211 is turned on and generates a first shutter switch signal SW1. Upon receiving the first shutter switch signal SW1, the system control unit 201 causes the image processing unit 224 to start AF processing, AE processing, AWB processing, EF processing, and/or the like.

When the operation of the shutter-release button 102 is completed, that is, the shutter-release button 102 is pressed fully (the shooting instruction), the second shutter switch 212 is turned on and generates a second shutter switch signal SW2. Upon receiving the second shutter switch signal SW2, the system control unit 201 starts a series of shooting processing from reading out the signal from the image capturing unit 222 to writing of image data to the recording medium 250.

The operation units 270 comprise operation members such as various switches and buttons for accepting various operations from a user, and notifying the system control unit 201 of the accepted operations, and include at least the following operation members: the shutter-release button 102, the mode selection switch 103, the main electronic dial 105, the power supply switch 106, the sub electronic dial 107, the cross key 108, the SET button 109, the video recording button 110, the enlargement button 111, the AE lock button 112, the reproduction button 113, and the menu button 114.

A power control unit 280 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each of the units including the recording medium 250.

A power supply unit 230 comprises a primary battery such as an alkaline battery or a lithium battery, a secondary battery such as a NiCd battery, a NiMH battery, or a Li-ion battery, or an AC adaptor. A recording medium interface (I/F) 218 is for interfacing with the recording medium 250 such as a memory card or a hard disk drive. The recording medium 250 is a recording medium such as a memory card for recording shot images, and constituted by a semiconductor memory, a magnetic disk, or the like.

A communication unit 254 is connected by a wireless antenna or a cable, and transmits and receives a video signal, an audio signal, and/or the like. The communication unit 254 can also connect to a wireless LAN (Local Area Network) and the Internet. The communication unit 254 can transmit image data (including a live view image) captured by the image capturing unit 222 and an image file recorded on the recording medium 250 to an external device, and can receive image data or other various information from the external device. Note that the communication unit 254 is not limited to a wireless LAN, but may use a wireless communication module such as an infrared communication, Bluetooth®, Bluetooth® Low Energy or Wireless USB, or a wired connection device such as a USB cable, HDMI®, IEEE 1394, or the like.

An attitude detection unit 255 detects the attitude (orientation) of the digital camera 100 with respect to the gravity direction. In this case, based on the attitude detected by the attitude detection unit 255, it is possible to discriminate whether an image captured by the image capturing unit 222 has been shot by setting the digital camera 100 in the landscape or portrait direction. The system control unit 201 can add information about the orientation information corresponding to the attitude detected by the attitude detection unit 255 to the image file, and rotate and record the captured image. An acceleration sensor, gyro sensor or the like may be used as the attitude detection unit 255. The attitude detection unit 255 can also detect the movement (pan, tilt, lift, rest, etc.) of the digital camera 100 by using the acceleration sensor or the gyro sensor.

An audio input unit 257 outputs an audio signal collected by a microphone incorporated in the digital camera 100 or an external microphone connected to the audio input terminal to the system control unit 201, and the system control unit 201 selects the input audio signal as necessary, converts the signal into a digital signal, and generates audio data through optimization processing of the level, reduction processing of a specific frequency, and/or the like.

The backside display unit 101 is provided with the touch panel 270a having a touch sensor capable of detecting a touch operation on a display screen. The touch panel 270a is an input device configured in a plane so as to be overlapped on the display screen of the backside display unit 101, and to output coordinate information corresponding to the touched position. The system control unit 201 can detect the following operations on the touch panel 270a. Touching on the touch panel 270a by a finger or pen (touch-down). A state in which the touch panel 27a is in contact with a finger or pen (touch-on). Movement of a finger or pen while in contact with the touch panel 27a (move). Taking off a finger or pen that has been in contact with the touch panel 271a (touch-up). A state in which nothing touches the touch panel 270a (touch-off). The continuous touch-down and touch-up of the touch panel 270a with a finger or a pen is referred to as a tap. These operations and the position coordinates in which a finger or a pen is touching the touch panel are notified to the system control unit 201, and the system control unit 201 determines what operation has been performed on the touch panel based on the notified information. The movement direction of the finger or the pen moving on the touch panel 270a can also be determined for each of the vertical component and the horizontal component of the touch panel 270a based on the change in position coordinates. In addition, when the touch panel 270a is touched up through a movement of a predetermined distance or more from the touchdown, the touch panel 270a is dropped through dragging (dragging and dropping). The touch panel 270a may be a touch panel of any of various types such as a resistive film type, an electrostatic capacitance type, a surface acoustic wave type, an infrared type, an electromagnetic induction type, an image recognition type, and an optical sensor type.

The disclosure is not limited to an image capture apparatus main body, and can also be applied in a control apparatus that communicates with an image capture apparatus (including a network camera) through wired or wireless communication and remotely controls the image capture apparatus. Apparatuses such as a smartphone, which is a type of mobile phone, a tablet PC, a desktop PC, or the like can be given as examples of control apparatuses that remotely control an image capture apparatus. The image capture apparatus can be controlled remotely by the control apparatus communicating commands for carrying out various types of operations, settings to the image capture apparatus, and/or the like on the basis of operations made in the control apparatus, processes carried out by the control apparatus, and the like. Additionally, a live view image shot by the image capture apparatus may be received by the control apparatus through wired or wireless communication and displayed.

Note that, in the present embodiment, a case has been described where the disclosure is applied to a digital camera as an example, but the disclosure is not limited to this example. That is, the disclosure can be applied to an apparatus that includes a display unit and can transfer data to an external apparatus, such as a PDA (Personal Digital Assistant), a mobile phone terminal, a mobile image viewer, a printer apparatus including a display, a digital photo frame, a music player, a game machine, or an electronic book reader.

The eye approach detection unit 217 detects whether an eye (an object) has approached (eye approaching) or has moved away from (eye detached) the eyepiece part 216 (approach detection). The system control unit 201 switches between display (a display state) and non-display (a non-display state) of the backside display unit 101 and the in-finder display unit 229 in accordance with the state detected by the eye approach detection unit 217. The system control unit 201 sets a display destination as the backside display unit 101 and sets the in-finder display unit 229 to the non-display state during non-eye approach detection at least in a case where the shooting mode and the switching of the display destination are automatic. Further, the system control unit 201 sets the display destination as the in-finder display unit 229 and sets the backside display unit 101 to the non-display state during eye approach detection.

If an object has approached, infrared light irradiated from a light emitting unit (not illustrated) of the eye approach detection unit 217 is reflected and incident on a light receiving unit (not illustrated) of the infrared proximity sensor. In accordance with an incident light amount of the infrared light received by the infrared proximity sensor, it is possible to detect an approach of some kind of physical object to the eyepiece part 216, and discriminate to what level of distance the object has gotten close to the eyepiece part 216 (an eye approaching distance). Upon detecting an approach of an object to the eyepiece part 216, the system control unit 201 can cause display of the in-finder display unit 229 to start. With this, it is possible for the in-finder display unit 229 to display without delay as much as possible when a user looks through the eyepiece part 216.

In addition, upon detecting that an object has approached within a predetermined distance with respect to the eyepiece part 216 from eye non-approaching state (no approach state), the eye approach detection unit 217 determines that an eye approaching is detected and transmits an eye approach detection notification to the system control unit 201. In addition, if an object for which an approach was detected is apart by the predetermined distance or more from an eye approaching state (approach state), the eye approach detection unit 217 determines that eye separation is detected, and an eye separation detection notification is transmitted to the system control unit 201. A threshold for detecting eye approaching and a threshold for detecting eye separation may be made different such as by providing hysteresis for example. In addition, it is assumed that, after eye approaching is detected, there is an eye approaching state until eye separation is detected. In addition, it is assumed that, after eye separation is detected, there is an eye non-approaching state until eye approaching is detected. With this, the system control unit 201 performs display control of the backside display unit 101 and the in-finder display unit 229 in response to an eye approaching state or an eye separation state detected by the eye approach detection unit 217.

Note that the eye approach detection unit 217 is not limited to an infrared proximity sensor, and another sensor may be used if it can detect an approach of an object or an eye to be deemed as an eye approaching.

The sight-line detection unit 260 includes a dichroic mirror 262, an image forming lens 263, a sight line detection sensor 264, a sight line detection circuit 265, and an infrared light-emission element 266 which follow, and detects whether or not there is a sight line of a user and also detects movement or a position of the sight line.

The infrared light-emission element 266 is a diode for emitting an infrared light for detecting a sight-line position of a user in a viewfinder screen, and irradiates the infrared light onto an eye 261 of a user toward the vicinity of the center of the eyepiece part 216. The infrared light irradiated from the infrared light-emission element 266 is reflected by the eye 261, and the reflected infrared light reaches the dichroic mirror 262. The dichroic mirror 262 has a function for reflecting on infrared light and allowing visible light to pass, and the reflected infrared light whose light path has been changed forms an image on an image capture plane of the sight line detection sensor 264 via the image forming lens 263.

The image forming lens 263 is an optical member that configures a sight line detection optical system. The sight line detection sensor 264 includes an image sensor that uses a CCD, CMOS, or the like. The sight line detection sensor 264 photo-electrically converts incident reflected infrared light into an electric signal, and outputs the electric signal to the sight line detection circuit 265. Based on the output signal from the sight line detection sensor 264, the sight line detection circuit 265 detects a sight-line position of a user from a position of a pupil or movement of the eye 261 of the user, and outputs detected information to the system control unit 201. The sight line detection sensor 264 can detect a pupil of an eye of a person, and thus, even if another object approaches or touches the eyepiece part 216, the sight line detection sensor 264 does not detect that a sight line of a person has been inputted. By this, the eyepiece part 216 has a function as a sight line operation unit, but the sight-line detection unit may be another configuration. Note that the user can set the sight line input function of the sight-line detection unit 260 to be enabled or disabled, for example, via a menu screen.

A gaze determination unit 267 has a predetermined threshold, and determines that a predetermined region is being gazed at if, based on the detection information received from the sight line detection circuit 265, the time that the photographer's sight line is fixed to the predetermined region continues for the predetermined threshold. The predetermined threshold value can be arbitrarily changed.

<Display Control Processing>

Next, with reference to FIGS. 3, 4 and 5, a display control according to the first embodiment will be described.

Figure 3:
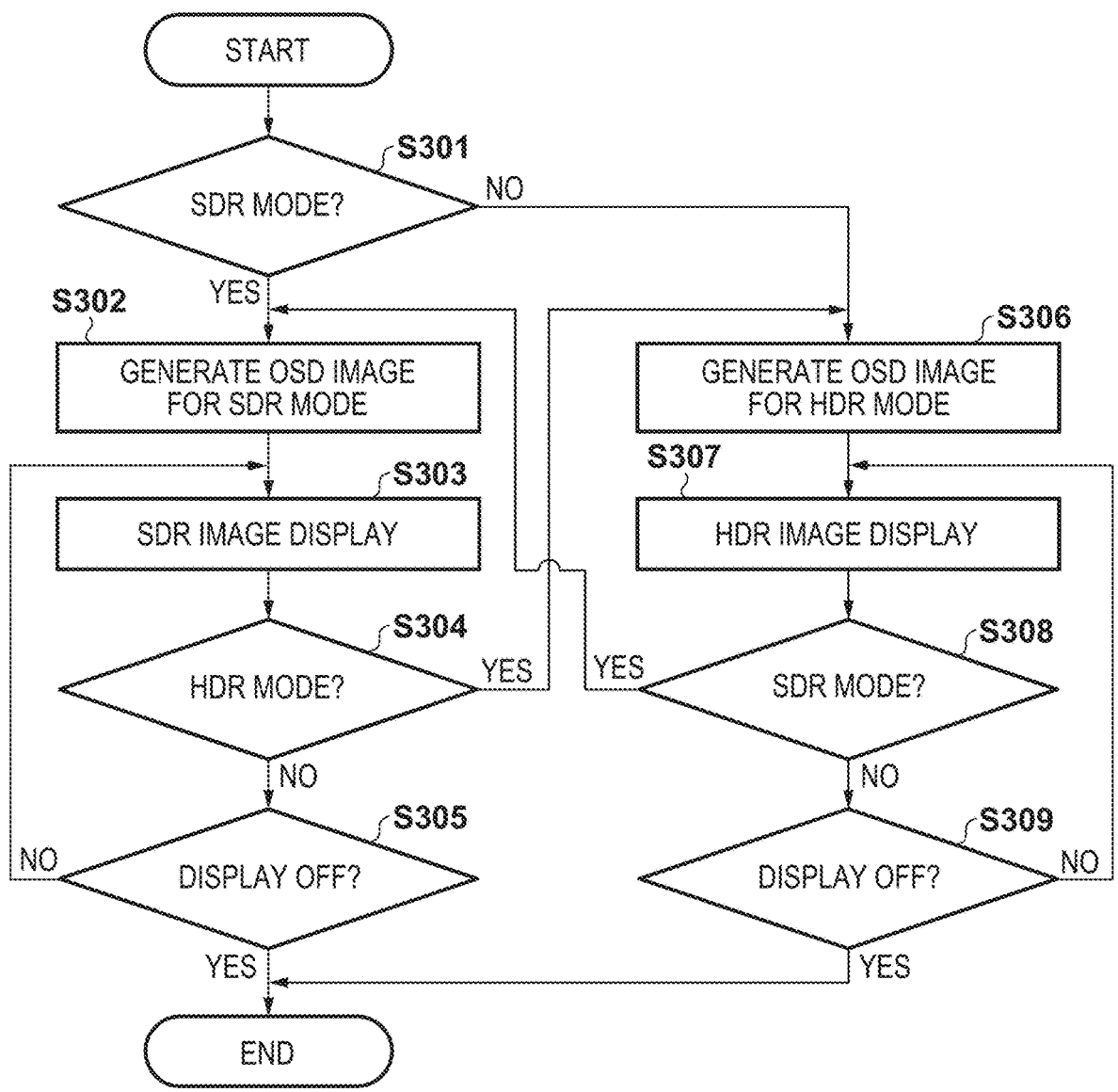
FIG. 3 is a flowchart illustrating display control processing of the present embodiment.

FIG. 3 is a flowchart illustrating a display control processing according to the first embodiment. The processing of FIG. 3 is realized by the power supply of the digital camera 100 being turned on, and the system control unit 201 expanding a program stored in the nonvolatile memory 256 into the system memory 252, and executing the program to control each functional block.

In step S301, the system control unit 201 determines whether or not the system is in the SDR mode, and the processing proceeds to step S302 when the system control unit 201 determines that the system is in the SDR mode, or the processing proceeds to step S306 when the system control unit 201 determines that the system is not in the SDR mode.

In step S302, the OSD generation unit 290 generates an OSD image based on the predetermined gradation characteristics of the OSD image in the SDR mode. An example of the gradation characteristic of the OSD image in the SDR mode is shown by coordinates 551 (x2, y2) and coordinates 554 (x4, y5) in FIG. 5. Details of FIG. 5 will be described later.

In step S303, the system control unit 201 displays SDR images on the in-finder display unit 229 or the backside display unit 101. The SDR image is an image signal obtained by superimposing the OSD image generated in step S302 on the image signal converted to the SDR mode. FIGS. 4A to 4D show examples of displaying images, which will be described in detail later.

In step S304, the system control unit 201 determines whether or not the system is switched to the HDR mode, and the processing proceeds to step S306 when the system control unit 201 determines that the system is switched to the HDR mode, and the processing proceeds to step S305 when the system control unit 201 determines that the system is not switched to the HDR mode.

In step S305, the system control unit 201 determines whether or not the display is off, and ends the processing when the system control unit 201 determines that the display is off, and the processing returns to step S303 when the system control unit 201 determines that the display is not off.

In step S306, the OSD generation unit 290 generates an OSD image based on the predetermined gradation characteristics of the OSD image in the HDR-mode. An example of the gradation characteristic of the OSD image in the HDR mode is shown by coordinates 553 (x1, y1) and coordinates 556 (x3, y4) in FIG. 5. Details of FIG. 5 will be described later.

Figure 5:
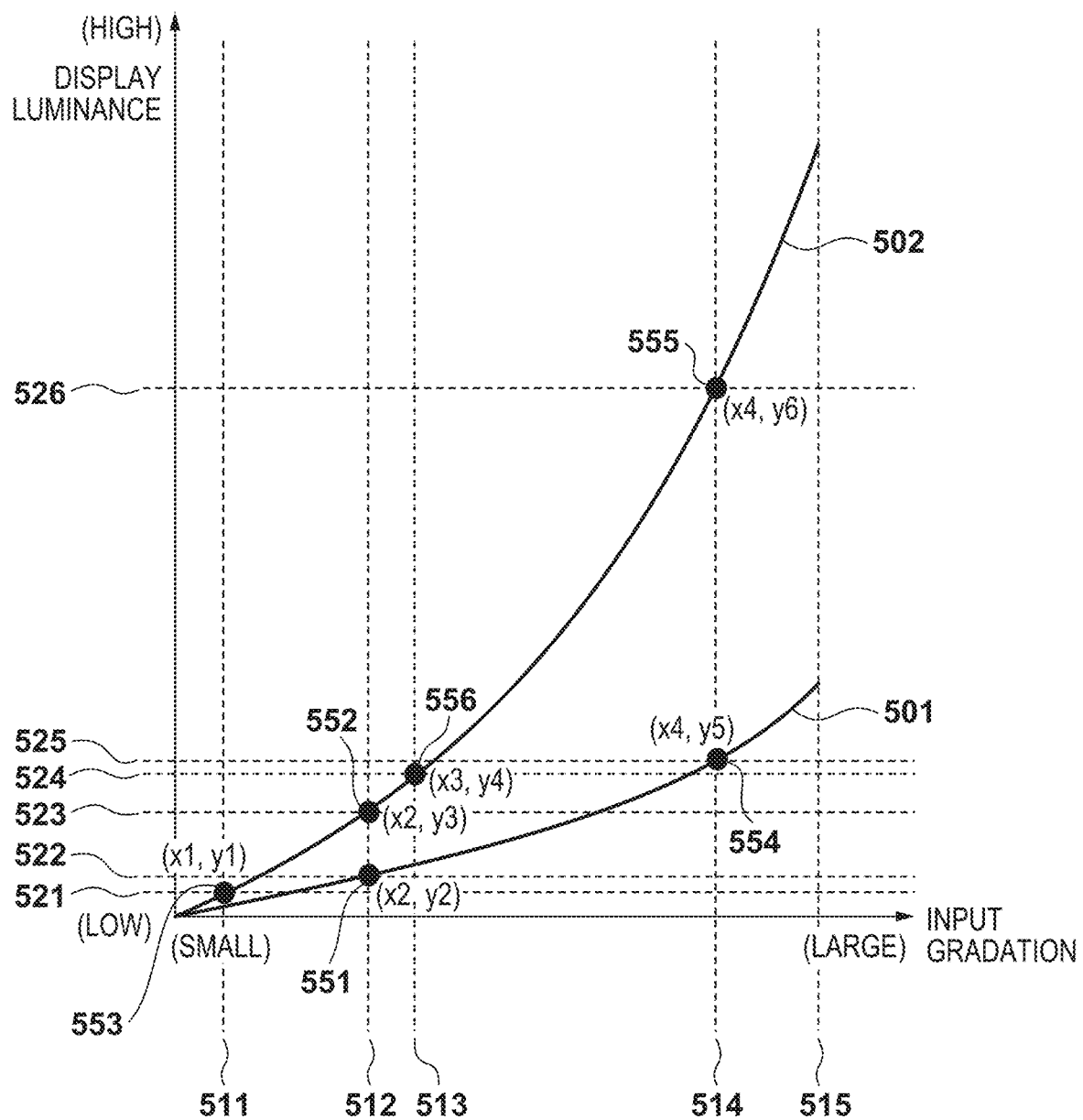
FIG. 5 is a diagram illustrating gradation characteristics of the present embodiment.

Since the OSD image when the gradation characteristic is changed from the SDR mode to the HDR mode uses image data of the same gradation, the black band image has a relationship as shown by coordinates 552 (x2, y3) in FIG. 5, and the character image has a relationship as shown by coordinates 555 (x4, y6) in FIG. 5. That is, in the HDR mode, since the display luminance is higher than in the SDR mode, it is concerned that power consumption is increased and luminance is degraded. Therefore, in the present embodiment, by changing the gradation ratio of the black band image for all the gradations that can be displayed in the HDR mode, the display luminance of the black band image in the HDR mode is controlled to be less than the display luminance of the black band image in the SDR mode, thereby suppressing increase in power consumption and reducing luminance degradation. In the present embodiment, an example of controlling the input gradation of the black band image is shown as a method of controlling the display luminance of the black band image, however, the control method of the display luminance of the black band image is not limited thereto. Similarly, for the character image, by changing the gradation ratio of the character image with respect to all the gradations that can be displayed in the HDR mode, the display luminance of the character image in the HDR mode is controlled to be equal to or less than the display luminance of the character image in the SDR mode, thereby suppressing increase in power consumption and reducing luminance degradation reducing increase in power consumption and luminance degradation. In the present embodiment, an example of controlling the input gradation of the character image is shown as a method of controlling the display luminance of the character image, however, the control method of the display luminance of the character image is not limited thereto.

On the other hand, the visibility of the OSD image is determined by the difference of the luminance between the character image luminance and the black band image luminance. When the display luminance is controlled as in the present embodiment, there is a possibility that the visibility of the OSD image is deteriorated. In the present embodiment, in order to prevent the deterioration of the visibility of the OSD image, the difference between the display luminance of the black band image and the display luminance of the character image in the HDR mode is controlled to be equal to or higher than the difference between the display luminance of the black band image and the display luminance of the character image in the SDR mode, that is, the ratio of the luminance of the character image to the luminance of the black band image in the HDR mode is controlled to be equal to or greater than the ratio of the luminance of the character image to the luminance of the black band image in the SDR mode.

In step S307, the system control unit 50 displays the HDR image on the in-finder display unit 229 or the backside display unit 101. The HDR image signal is image signal obtained by superimposing the OSD image generated in step S306 on the image signal converted to the HDR mode. FIGS. 4A to 4D show examples of displaying images, which will be described in detail later.

In step S308, the system control unit 201 determines whether or not the system is switched to the SDR mode, and the processing proceeds to step S302 when the system control unit 201 determines that the system is switched to the HDR mode. When the system control unit 201 determines that the system is not switched to the HDR mode, the processing proceeds to step S309.

In step S309, the system control unit 201 determines whether or not the display is off, and ends the processing when the system control unit 201 determines that the display is off, and the processing returns to step S307 when the system control unit 201 determines that the display is not off.

FIGS. 4A to 4D are diagrams illustrating the display control according to the present embodiment.

Figure 4A:
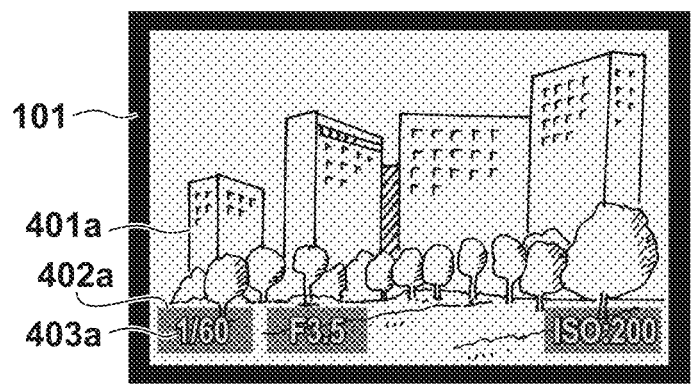
FIGS. 4A to 4D are diagrams illustrating the display control process of the present embodiment.

FIG. 4A exemplifies an image displayed on the backside display unit 101 in the SDR mode. The image includes a moving image and a still image. The image 401*a* is an SDR image displayed on the backside display unit 101 in the SDR mode. A black band image 402a and a character image 403a are superimposed on the SDR image 401a. Coordinates (input gradation, display luminance) of the black band image 402a are, for example, coordinates 551 (x2, y2) in FIG. 5. Coordinates (input gradation, display luminance) of the character image 403a are, for example, 554 (x4, y5) in FIG. 5.

Figure 4B:
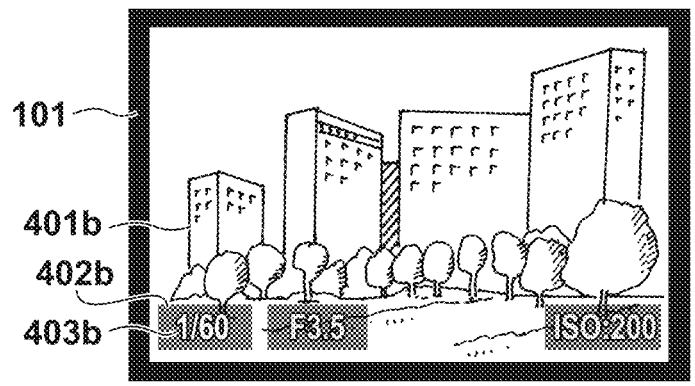

FIG. 4B exemplifies an image displayed on the backside display unit 101 in a conventional HDR mode. The image 401b is an HDR image displayed on the backside display unit 101 in the HDR mode. A black band image 402b and a character image 403b are superimposed on the HDR image 401b. Coordinates (input gradation, display luminance) of the black band image 402b is, for example, 552 (x2, y3) in FIG. 5. Coordinates (input gradation, display luminance) of the character image 403b are, for example, 555 (x4, y6) in FIG. 5.

Figure 4C:
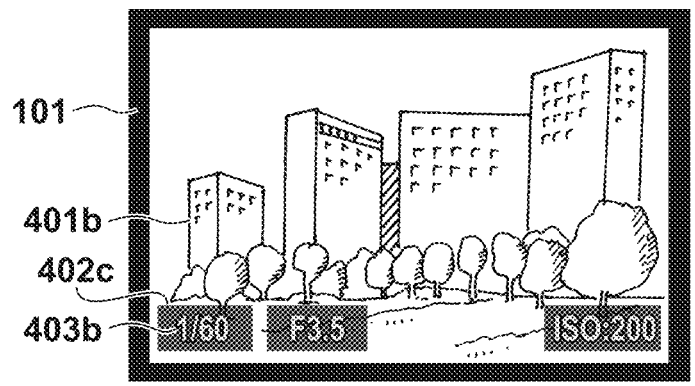

FIG. 4C exemplifies an image in which the display luminance of the black band image is controlled to be less than the display luminance of the SDR mode in the HDR mode according to the present embodiment. Coordinates (input gradation, display luminance) of the black band image 402c are, for example, 553 (x1, y1) in FIG. 5. The display luminance of the black band image 402c is controlled to be less than the display luminance of the black band image 402b in FIG. 4B, thereby suppressing increase in power consumption and reducing luminance degradation as compared with a conventional HDR mode.

Figure 4D:
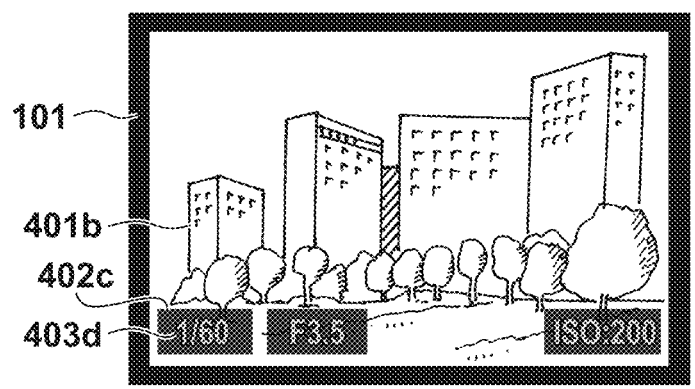

FIG. 4D exemplifies an image in which the display luminance of the black band image in the HDR mode of the present embodiment is controlled to be less than the SDR mode, and the display luminance of the character image is controlled to be equal to or less than the display luminance of the SDR mode. Since the display luminance of the black band image 402c is controlled to be less than the display luminance of the SDR mode, it is possible to suppress increase in power consumption and reduce luminance degradation as compared with the conventional HDR mode. Further, since the display luminance of the character image 403d is controlled to be equal to or less than the display luminance of the SDR mode, it is possible to suppress increase in power consumption and reduce luminance deterioration as compared with the conventional HDR mode.

FIG. 5 is a diagram illustrating an example of the gradation characteristics according to the present embodiment, the horizontal axis represents the input gradation of the image signal output from the system control unit 201 to the in-finder display unit 229 and the backside display unit 101, the vertical axis represents the display luminance. The input gradation is normalized by the maximum gradation, and can be applied even if the bit width is different.

A characteristic curve 501 is an example of the first gradation characteristic 201b. The first gradation characteristic 201b is a gradation characteristic of the SDR mode. A characteristic curve 502 is an example of the second gradation characteristic 201c.

An input gradation 511 is an example of the input gradation of the black band image in the HDR mode. An input gradation 512 is an example of the input gradation of the black band image in the SDR mode and the input gradation of the black band image in the conventional HDR mode. An input gradation 513 is an example of the input gradation of the character image in the HDR mode. An input gradation 514 is an example of the input gradation of the character image in the SDR mode and the input gradation of the character image in the conventional HDR mode.

A display luminance 521 is an example of the display luminance of the black band image in the HDR mode. A display luminance 522 is an example of the display luminance of the black band image in the SDR mode. A display luminance 523 is an example of the display luminance of the black band image in the conventional HDR mode. A display luminance 524 is an example of the display luminance of the character image in the HDR mode. A display luminance 525 is an example of the display luminance of the character image in the SDR mode. A display luminance 526 is an example of the display luminance of a character image in the conventional HDR mode.

Coordinates 551 is coordinates (x2, y2) of the input gradation and the display luminance of the black band image in the SDR mode. Coordinates 552 is coordinates (x2, y3) of the input gradation and the display luminance of the black band image in the conventional HDR mode. Coordinates 553 is the coordinate (x1, y1) of the input gradation and the display luminance of the black band image in the HDR mode. Coordinates 554 are coordinates (x4, y5) of the input gradation and the display luminance of the character image in the SDR mode. Coordinates 555 are coordinates (x4, y6) of the input gradation and the display luminance of the character image in the conventional HDR mode. Coordinates 556 are coordinates (x3, y4) of the input gradation and the display luminance of the character image in the HDR mode.

As described above, according to the present embodiment, it is possible to suppress increase in power consumption and reduce luminance degradation of the OSD image in the HDR mode, and the same or higher visibility as the SDR mode can be ensured. In the present embodiment, an example in which the input gradation of the black band image is changed has been described. However, when the system having the black band image generating unit that can change a transmittance, it is also possible to suppress increase in power consumption and reduce luminance degradation by lowering the transmittance of the black band image in the HDR mode than that in the SDR mode.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-022669, filed Feb. 13, 2020 which is hereby incorporated by reference herein in its entirety.

What is claimed is:

1. A display apparatus comprising:
a control circuit configured to switch to any one of a plurality of modes including a first mode capable of displaying an image of a first dynamic range on a display circuit and a second mode capable of displaying an image of a second dynamic range wider than the first dynamic range on a display circuit; and
a generating circuit configured to generate a partial image which includes at least a black region and is superimposed on an image displayed on the display circuit,
wherein the control circuit controls a luminance of the black region of the partial image in the second mode to be less than a luminance of the black region of the partial image in the first mode by changing a ratio of a gradation of the black region with respect to all gradations that can be displayed.

2. The apparatus according to claim 1, wherein
the partial image includes character and/or graphic region,
the control unit controls the luminance of the character region in the second mode to be less than the luminance of the character region in the first mode.

3. The apparatus according to claim 2, wherein the control unit changes a ratio of a gradation of the character and/or graphic region with respect to all the gradations that can be displayed.

4. The apparatus according to claim 3, wherein the control unit controls the ratio of the luminance of the character and/or graphic region to the luminance of the black region in the second mode to be equal to or greater than the ratio of the luminance of the character and/or graphic region to the luminance of the black region in the first mode.

5. The apparatus according to claim 1, wherein
the control unit is capable of changing a transmittance of the image including the black region,
the transmittance of the black region in the second mode is controlled to be smaller than the transmittance of the black region in the first mode.

6. The apparatus according to claim 1, wherein the first dynamic range is SDR (Standard Dynamic Range),
the second dynamic range is High Dynamic Range.

7. A method of controlling a display apparatus comprising:
switching to any one of a plurality of modes including a first mode capable of displaying an image of a first dynamic range on a display unit and a second mode capable of displaying an image of a second dynamic range wider than the first dynamic range on the display unit;
generating a partial image which includes at least a black region and is superimposed on the image displayed on the display unit; and
controlling such that a luminance of the black region of the partial image in the second mode is less than a luminance of the black region of the partial image in the first mode by changing a ratio of a gradation of the black region with respect to all gradations that can be displayed.

8. A non-transitory computer-readable storage medium storing a program that causes a computer to execute a method of controlling a display apparatus comprising:
switching to any one of a plurality of modes including a first mode capable of displaying an image of a first dynamic range on a display unit and a second mode capable of displaying an image of a second dynamic range wider than the first dynamic range on the display unit;
generating a partial image which includes at least a black region and is superimposed on the image displayed on the display unit; and
controlling such that a luminance of the black region of the partial image in the second mode is less than a luminance of the black region of the partial image in the first mode by changing a ratio of a gradation of the black region with respect to all gradations that can be displayed.

* * * * *